United States Patent [19]

Toga

[11] Patent Number: 6,041,355

[45] Date of Patent: Mar. 21, 2000

[54] METHOD FOR TRANSFERRING DATA BETWEEN A NETWORK OF COMPUTERS DYNAMICALLY BASED ON TAG INFORMATION

[75] Inventor: James E. Toga, Portland, Oreg.

[73] Assignee: Intel Corporation, Santa Clara, Calif.

[21] Appl. No.: 08/773,602

[22] Filed: Dec. 27, 1996

[51] Int. Cl.$^7$ .............................. G06F 13/00; G06F 15/16
[52] U.S. Cl. .......................... 709/227; 709/249; 709/218
[58] Field of Search ...................... 395/200.47, 200.48, 395/200.49, 200.79, 200.53, 200.54, 200.55, 200.56; 707/501, 513, 911

[56] References Cited

U.S. PATENT DOCUMENTS

| | | | |
|---|---|---|---|
| 5,550,984 | 8/1996 | Gelb | 395/200.17 |
| 5,623,601 | 4/1997 | Vu | 395/187.01 |
| 5,678,041 | 10/1997 | Baker et al. | 707/9 |
| 5,699,513 | 12/1997 | Feigen et al. | 395/187.01 |
| 5,706,507 | 1/1998 | Schloss | 707/104 |
| 5,727,129 | 3/1998 | Barrett et al. | 706/10 |
| 5,727,159 | 3/1998 | Kikinis | 395/200.76 |
| 5,752,242 | 5/1998 | Havens | 707/3 |
| 5,767,893 | 6/1998 | Chen et al. | 348/7 |
| 5,774,664 | 6/1998 | Hidary et al. | 709/218 |
| 5,778,174 | 7/1998 | Cain | 395/187.01 |
| 5,867,651 | 2/1999 | Dan et al. | 709/203 |
| 5,878,231 | 3/1999 | Baehr et al. | 709/245 |
| 5,898,830 | 4/1999 | Wesinger, Jr. et al. | 713/201 |
| 5,905,872 | 5/1999 | DeSimone et al. | 709/245 |

OTHER PUBLICATIONS

Ian S. Graham, *HTLM Source Book, A Complete Guide to HTMI 3.0*, Table of Contents, Chapter 3, pp. 91–123, Chapters 6–8, pp. 351–450, Chapter Second Edition, Wiley Computer Publishing, John Wiley & Sons, Inc.

Comer (Internetworking with TCP/IP vol. 1: Protocols, and Architecture), pp. 142–144.

*Primary Examiner*—Zarni Maung
*Assistant Examiner*—Andrew Caldwell
*Attorney, Agent, or Firm*—Charles K. Young

[57] ABSTRACT

A method of controlling the transfer of data between a first and a second computer network comprises parsing content description language received from the first computer network by the second computer network to determine current tag information within the content description language. A completion decision is then dynamically made based upon the current tag information. In one embodiment, the completion decision may include any of the following: full data transfer between the two networks, partial data transfer between the two networks, a deferred data transfer at a later time, or a cached data transfer. Restrictions based upon a user's age, a user's access rights, cost, system resources, and time of day may also be employed to limit the transfer of data based upon the current tag information. In a preferred embodiment, the content description language is HTML. This method may be practiced by an application level proxy that is part of a firewall system protecting the second computer network from the first.

17 Claims, 3 Drawing Sheets

```
<HTML> <HEAD>

<TITLE> This is a simple title </TITLE>

</HEAD>

<COST> 36 credits </COST>

<EMBEDDED LOAD> 6 mb/sec </EMEDDED LOAD>

<CONTENT> Violent content </CONTENT>
```

FIG. 2

METHOD FOR TRANSFERRING DATA BETWEEN A NETWORK OF COMPUTERS DYNAMICALLY BASED ON TAG INFORMATION

FIELD OF THE INVENTION

The present invention relates to the field of providing information over a network. More particularly, this invention relates to filtering data transferred between two networks based upon tags indicative of the content of the data.

BACKGROUND OF THE INVENTION

The World Wide Web (WWW) is a fully multimedia-enabled hypertext system used for navigating the Internet. WWW may cope with any type of data which may be stored on computers, and may be used with an Internet connection and a WWW browser. WWW is made up of millions of interconnected pages or documents which can be displayed on a computer or other interface to the WWW. Each page can have connections to other pages which may be stored on any computer connected to the Internet.

WWW is based on the concept of hypertext which is very similar to ordinary text, except that for hypertext, connections to other parts of the text or to other documents can be hidden behind words and phrases. The connections to these hypertext are referred to as hypertext links, and they allow the user to read the document in any order desired. WWW also utilizes hypermedia which allows links to connect to not only words but also with pictures, sounds and any other data files which can be stored on a computer.

More specifically, hypermedia is a method of connecting data files together regardless of their format. The hypermedia links held on a given WWW page describes the location of the document which a WWW browser should display by using a Uniform Resource Locator (URL). URLs enable WWW browsers to go directly to any file held on any WWW server. URL is a naming system, typically consisting of three parts, the transfer format (also known as the protocol type), the host name of the machine which holds the file (may also be referred to as the WWW server name) and the path name to the file. The transfer format for standard WWW pages is Hypertext Transfer Protocol (HTTP). Standard Internet naming conventions are utilized for the host name portion of the URL. UNIX* directory naming conventions are utilized to indicate the path name of the file.

*Third-party marks and brands are the property of their respective owners.

A firewall is used to separate one network of computers from another. For example, a corporation that connects to the Internet and WWW may install a firewall to prevent users outside the corporation from accessing data stored on the computer network within the corporation. Additionally, the firewall can prevent users within the corporation from accessing data on the Internet and WWW.

For example, a firewall may be configured to allow certain machines to be reached and not others. The firewall may be further programmed to allow certain applications to pass through the firewall and to deny access to other applications. This provides a secure, but coarse level of access control for corporate Intranets.

A proxy sits on top of a firewall. A proxy looks at a higher level of the data transfer. It is typically a process that responds and acts on behalf of client requests. A proxy may be used to improve performance by caching data from previous retrievals. A proxy may look at the data requests from the users within the corporation and prevent requests from being sent out which have a particular keyword in the URL. This, for example, may be used to prevent the retrieval of sexually explicit material from the Internet by performing a search of the words of the URL in a dictionary having particular banned keywords.

SUMMARY OF THE INVENTION

A method of controlling data transfer between a first network and a second network of computers is described. Content description language received from the first network by the second network is parsed to determine tag information within the content description language. The second network of computers makes a completion decision as to whether to allow the transfer based on the tag information.

These and other advantages of the present invention are fully described in the following detailed description.

BRIEF DESCRIPTION OF THE DRAWINGS

FIG. 2 is an example indicating tags within content description language.

DETAILED DESCRIPTION

A method of controlling data transfer between a first network and a second network of computers is described. Content description language, such as Hypertext Markup Language (HTML), received from the first network by the second network is parsed to determine tag information within the content description language. The second network of computers makes a completion decision as to whether to allow the transfer based on the tag information. The second network of computers may allow complete transfer or partial transfer of the data. The second network of computers may defer the transfer until a later time, or it may cache the transfer to allow its clients to access the data from this transfer without the need to retrieve the data a second time from the first network. Various other completion decisions based upon resource constraints, content based upon age, and pricetag of the content are possible.

Figure 1:
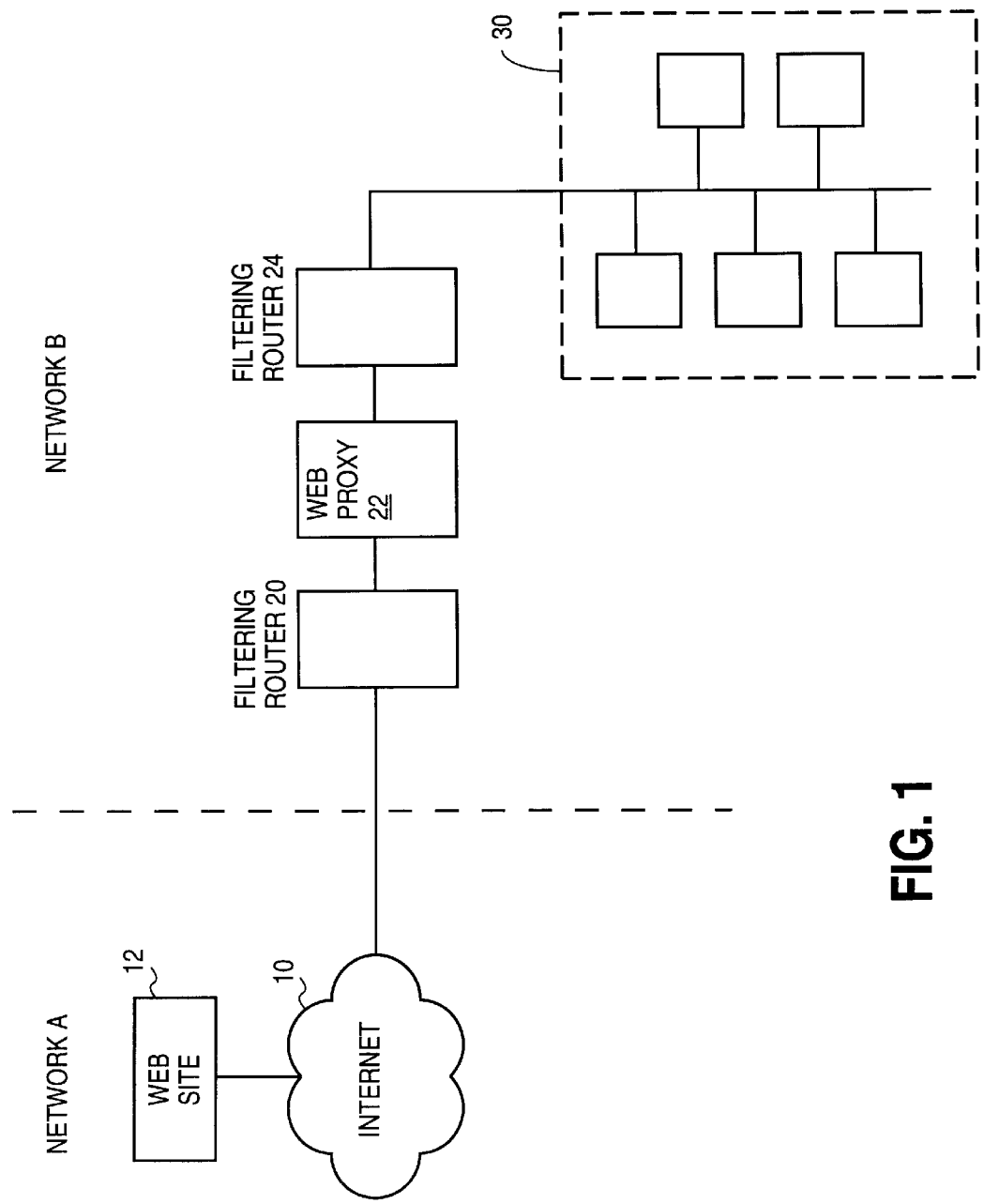
FIG. 1 is a block diagram of a firewall separating a first network from a second network of computers.

FIG. 1 is a block diagram of a firewall separating a first network from a second network of computers. The first network, network A, is the internet 10 which includes the World Wide Web and its many web sites, such as web site 12.

Network A is coupled to Network B, which may be a corporate network of computers, for example. In one embodiment, Network B comprises a first filtering router 20, a web proxy 22, and a second filtering router 24. Network B may also host many other client computers 30 connected to its network.

The filtering router 20 is connected to the Internet 10. The filtering router 20 accepts only requests from the web proxy 22 for retrieving data from the internet 10. The filtering router 20 also only allows data received from the internet 10 to be provided to the web proxy 22.

Similarly, the filtering router 24 is connected to the client computers 30. The filtering router 24 accepts requests from the client computers 30 only directed to the web proxy 22. The filtering router 24 also only allows data from the web proxy 22 to be provided to the client computers 30.

The web proxy 22 sits between the filtering routers 20 and 24. Thus, the web proxy buffers the client computers 30 from accessing the internet 10 directly. The web proxy is able to monitor all data leaving network B and being retrieved from Network A.

In the prior art, the web proxy 22 receives a request via filtering router 24 from one of its clients to retrieve data from the internet. The web proxy requests the data from the internet which is allowed to pass through the filtering router 20. When the data is returned from the internet, the filtering router 20 allows the data to be provided to the web proxy 22. The web proxy then provides the data to the client 30 that requested the data.

In the present invention, the web proxy monitors the content description language that was returned from the internet. The web proxy looks at tags that indicate information about the content of the data, as will be described further with reference to FIG. 2. The web proxy then determines completion decisions as to whether to allow the transfer of data based upon the tag information. For example, the web proxy may allow complete transfer or partial transfer of the data. It may defer the transfer until a later time, or it may cache the transfer to allow its clients to access the data from this transfer without the need to retrieve the data a second time from the internet. Various other completion decisions based upon resource constraints, content based upon age, and pricetag of the content are possible, as will be described.

The web proxy 22 may be comprised of one or more computers. Additionally, web proxy 22 may comprise other proxies which communicate with the internet, such as mail proxies and ftp proxies. Web proxy 22 processes the requests for data from the client computers 30 and the data received from the internet 10.

FIG. 2 is an example indicating tags within content description language. The tags are used for displaying the data in an appropriate manner by the browser. Various multimedia abilities, such as adding sound and hypertext links are possible through the tags. Many tags are standardized so that all browsers will know how to interpret the tags. Some browsers include proprietary tags which improve the display of the content on their own browsers.

The present invention uses tags which can be used by the web proxy to determine whether to allow subsequent data transfers of content description language. The tags "cost", "embedded load", and "content" are examples of new tags added to implement the present invention.

Financial

In one embodiment of the invention, financial tags are included to indicate the cost of the content of the subsequent data transfers of content description language. For example, FIG. 2 includes the tag "cost." The cost can be expressed in dollars or in other units.

The web proxy is able to compare the cost of the content against a spending limit of the user that requested the data. If the cost of the content is higher than the spending limit, then the transfer will be denied. The spending limit in this case may be per access, or it may be a cumulative limit that is being exceeded.

Resource Constraints

In another embodiment, the tags indicate either the size or a rate of transfer of the subsequent data transfers of content description language. For example, FIG. 2 includes the tag "embedded load" that indicates a streaming rate of transfer of subsequent data transfers of content description language. During certain times of the day the Network B may disallow transfer of files over a specified size, or may prevent the transfer of streaming files greater than a specified rate of transfer. At other times of the day, these transfers will be allowed. These restrictions are often based upon resource constraints of the network during peak hours during which normal business over the Network B would become too slow without the restrictions.

Certain users, however, may be allowed access to files of any size or data transfer rate at any time of the day. The web proxy uses these access rights to appropriately determine completion actions whether to allow the transfer.

Miscellaneous Content Restrictions

Other predetermined tag information that can be used by the web proxy to make completion decisions include content restrictions based upon sexual or violent content. The web proxy includes information about the users on its client systems which allows the web proxy to determine whether certain users should be allowed to access the subsequent data transfers of content description language.

Figure 3:
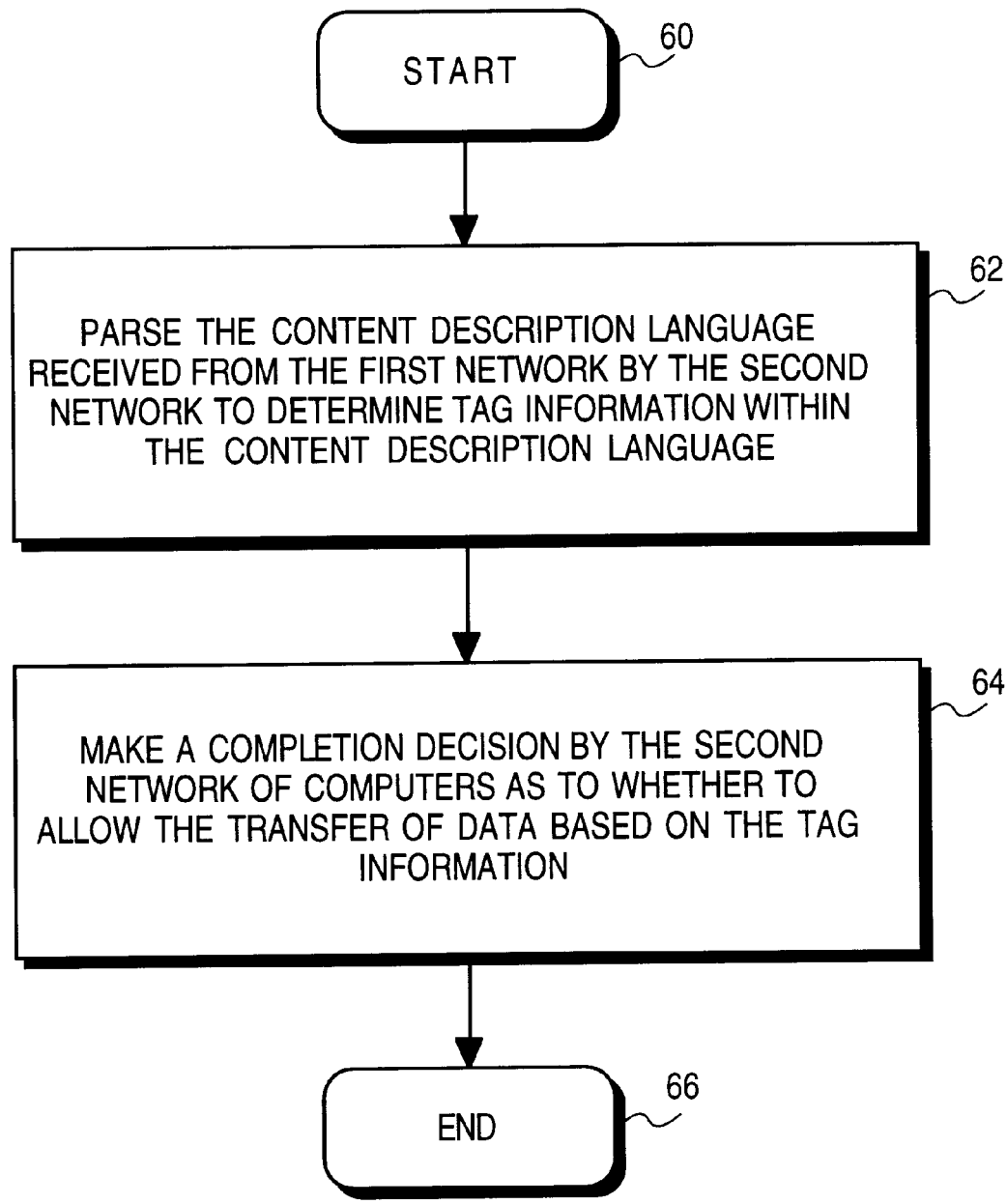
FIG. 3 shows a flowchart of the steps taken using the present invention.

FIG. 3 shows a flowchart of the steps taken using the present invention. The flowchart starts at block 60 from which it continues at block 62. At block 62, content description language received from the first network of computers is parsed by the second network of computers to determine tag information within the content description language. Operation continues at block 64 at which a completion decision is made by the second network of computers as to whether to allow the transfer of data based on the tag information. The flowchart terminates at block 66.

The completion decision may be based upon various constraints of the networks and access rights of the requesting clients. These constraints may include, but is not limited to, financial constraints, resource constraints, age restrictions, user restrictions, and time of day restrictions.

In the foregoing specification, the invention has been described with reference to specific exemplary embodiments thereof. It will, however be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of controlling transfer of data between a first network of computers and a second network of computers, the method comprising the steps of:

(a) parsing content description language received from the first network of computers by the second network of computers to determine current tag information within the content description language; and (b) dynamically making a completion decision by the second network of computers as to whether to allow the transfer of data based on the current tag information, wherein the completion decision is based upon a resource constraint of the second network of computers.

2. The method of claim 1 wherein the completion decision determines whether the transfer is allowed to occur.

3. The method of claim 1 wherein the completion decision determines whether only a partial transfer is allowed to occur.

4. The method of claim 3 wherein text but not pictures are allowed to be transferred.

5. The method of claim 1 wherein the content description language is HTML.

6. The method of claim 1 wherein the current tag information of step (a) includes a pricetag for the transfer of data, and wherein the completion decision of the step (b) is based upon the pricetag for the transfer of data.

7. The method of claim 1 wherein the completion decision results in a transfer that is to be deferred until a later time.

8. The method of claim 1 wherein the completion decision results in a transfer that is cached based on the tag information.

9. A method of controlling transfer of data between a first network of computers and a second network of computers, the method comprising the steps of:

(a) parsing content description language data received from the first network of computers by the second network of computers to determine current tag information indicating a pricetag for a content of subsequent transfers of content description language data, wherein the content description language data originates from a location that is not previously profiled in a relational database of the second network of computers; and (b) dynamically allowing the subsequent transfers of content description language data if the pricetag is below a predetermined nonzero spending limit.

10. The method of claim 9 wherein a user on the second network of computers requests the subsequent transfers of content description language data and the predetermined nonzero spending limit is associated with the user.

11. The method of claim 9 further comprising:

(c) subtracting the pricetag from a budget amount attributed to a user that requested the subsequent transfers of content description language data.

12. A method of controlling transfer of data between a first network of computers and a second network of computers, the method comprising the steps of:

(a) parsing content description language data received from the first network of computers by the second network of computers to determine tag information indicating a size of subsequent transfers of content description language data, wherein the content description language data originates from a location that is not previously profiled in a relational database of the second network of computers; and (b) disallowing the subsequent transfers of content description language data if the size of the subsequent transfers of content description language interferes with resource constraints of the second network of computers.

13. The method of claim 12 wherein the step (b) of disallowing the subsequent transfers of content description language data is also based upon time of day restrictions.

14. The method of claim 12 wherein the tag information indicates that the subsequent transfers of content description language data are entertainment-based.

15. A method of controlling transfer of data between a first network of computers and a second network of computers, the method comprising the steps of:

(a) parsing content description language data received from the first network of computers by the second network of computers to determine tag information about subsequent transfers of content description language data, wherein the content description language data originates from a location that is not previously profiled in a relational database of the second network of computers; and (b) disallowing the subsequent transfers of content description language data based upon a time of day restriction specified by the tag information.

16. The method of claim 15 wherein the predetermined tag information indicates that the subsequent transfers of content description language data are entertainment-based.

17. A method of controlling transfer of data between a first network of computers and a second network of computers, the method comprising the steps of:

(a) parsing content description language data received from the first network of computers by the second network of computers to determine tag information about subsequent transfers of content description language data, wherein the content description language data originates from a location that is not previously profiled in a relational database of the second network of computers; and (b) disallowing the subsequent transfers of content description language data based upon age restrictions of a requester of the content description language data, wherein the age restrictions are specified by the tag information.

* * * * *